United States Patent

[11] 3,617,540

[72] Inventors Dolloff F. Bishop
 Camp Springs;
 John B. Stamberg, Silver Spring, both of Md.
[21] Appl. No. 36,726
[22] Filed May 13, 1970
[45] Patented Nov. 2, 1971
[73] Assignee The United States of America as represented by the Secretary of the Interior

[54] REMOVAL OF NITROGEN AND PHOSPHORUS FROM WASTE WATERS
9 Claims, 2 Drawing Figs.

[52] U.S. Cl. .................................................. 210/16, 210/18, 210/40
[51] Int. Cl. .................................................. C02c 1/02
[50] Field of Search ........................................ 210/3–8, 15, 16, 18, 40

[56] References Cited
UNITED STATES PATENTS
| | | | |
|---|---|---|---|
| 3,385,785 | 5/1968 | Forrest et al. .................. | 210/6 |
| 3,386,911 | 6/1968 | Albertson ..................... | 210/18 |
| 3,409,545 | 11/1968 | Albertson ..................... | 210/48 |
| 3,423,309 | 1/1969 | Albertson ..................... | 210/18 X |
| 3,455,820 | 7/1969 | Joyce et al. ................... | 210/40 |

OTHER REFERENCES

Johnson, W. K., et al., Nitrogen Removal by Nitrification and Denitrification, Jour. WPCF, Vol. 36, Aug. 1964, pp. 1,015– 1,036 (P.O.S.L.)

Barth, E. F., et al., Chemical-Biological Control, etc., Jour. WPCF, Vol. 40, Dec. 1968, pp. 2,040– 2,054 (P.O.S.L.)

Owen, R., Removal of Phosphorus, etc., Sewage and Ind. Wastes, Vol. 25, May 1953, pp. 548– 556 (P.O.S.L.)

Primary Examiner—Michael Rogers
Attorneys—Ernest S. Cohen and Roland H. Shubert

ABSTRACT: Nitrogen and phosphorus are removed from waste waters by a process including the steps of biological nitrification, chemical precipitation of phosphorus and biological denitrification. Buffering capacity of the water is substantially reduced and in some cases nearly eliminated by reaction of acid, produced in the nitrification step, with bicarbonate ion contained in the waste water. A precipitate containing phosphate in high concentration is recovered at low chemical cost.

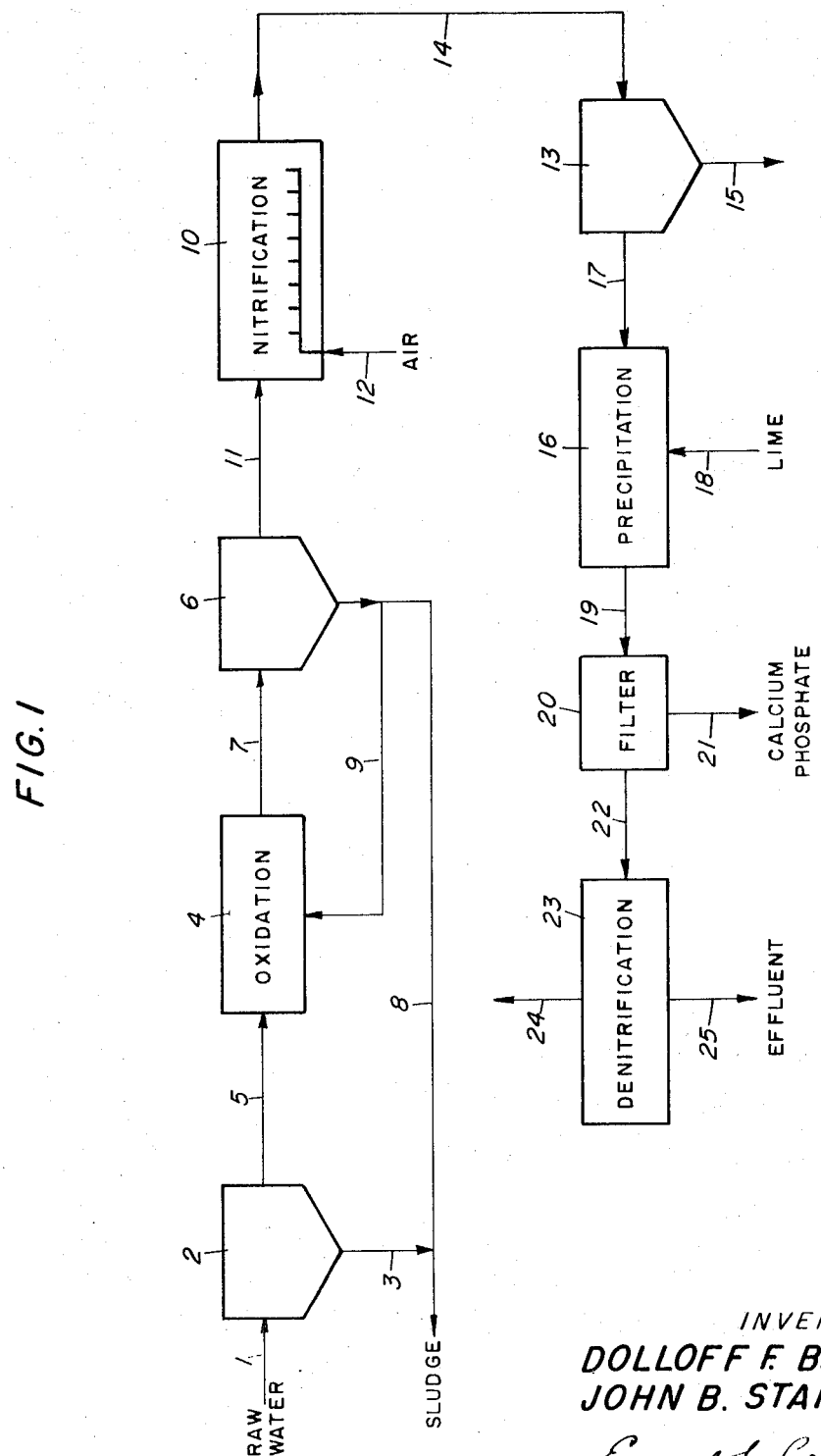

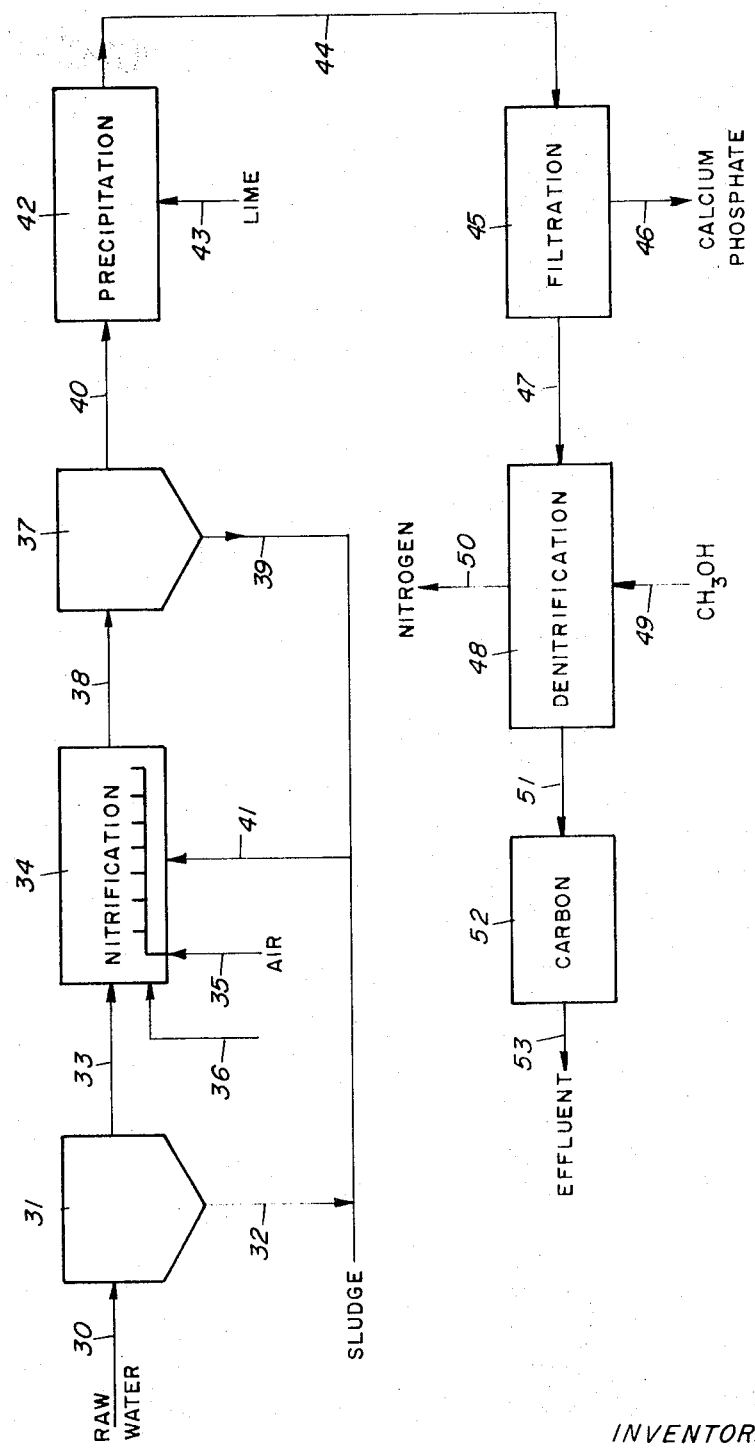

3,617,540

REMOVAL OF NITROGEN AND PHOSPHORUS FROM WASTE WATERS

BACKGROUND OF THE INVENTION

Phosphorus and nitrogen compounds introduced into surface waters from waste water streams contribute substantially to the progressive fertilization of lakes and streams. This fertilization tends to produce blooms in aquatic vegetation degrading the quality and esthetics of the water body. Since ultimate development of aquatic blooms is limited by nutrient availability, reduction of available phosphorus, nitrogen or both results in a limitation on undesirable aquatic growth.

Water quality standards now require the essential elimination of phosphorus and the substantial reduction of nitrogen compounds from effluent wastes discarded into surface waters. Phosphates are generally removed from waste waters by chemical precipitation using metal salts including those of iron, aluminum and calcium. Illustrative of this approach is the Barth et al. U.S. Pat. No. 3,480,144. They show that addition of metal salts, such as sodium aluminate, to the aeration step of a conventional sewage treatment process will remove substantially all of the phosphates contained in a sewage stream. In other approaches to phosphate removal, chemical precipitation is accomplished as a separate unit operation or tertiary treatment of the effluent stream. This approach is illustrated in an article by Lea et al., entitled Removal of Phosphates from Treated Sewage and published in Sewage and Industrial Wastes, Volume 26, pages 261–275, Mar. 1954.

Some of the methods proposed and used for nitrogen removal include biological nitrification-denitrification, break point chlorination and ammonia stripping. In work published as Chemical-Biological Control of Nitrogen and Phosphorus in Waste Water Effluent (Journal, Water Pollution Control Federation, Vol. 40, No. 12, pages 2,040–54, Dec. 1968) Barth et al., disclose an integrated process for the removal of both phosphorous and nitrogen. Phosphates were removed in the manner disclosed in the previously cited patent while nitrogen compounds were biologically converted to nitrates. Nitrates were then decomposed to nitrogen gas, again by biological means.

Chemical precipitation of phosphates using aluminum and iron salts is an expensive operation. Calcium is a rather poor precipitant at the ordinary pH levels at which sewage treatment processes operate. In all of the prior art processes, recovery of phosphate in a relatively concentrated form has not proved feasible.

SUMMARY OF THE INVENTION

We have found that by arranging and operating known water treatment techniques in a particular manner, we can remove substantially all contained phosphorus compounds from waste water and substantially reduce the level of nitrogen compounds in a very economical fashion. We utilize the acid-production capacity of biological nitrification to substantially decrease the buffering capacity of the water. This in turn allows lime to be used in low concentrations as a precipitant for phosphate to insolubilize and recover calcium phosphate compounds in a relatively pure form.

Waters amenable to treatment using our process include many domestic and industrial waste waters as well as some natural water streams. For our process to function, it is necessary that the water stream being treated contain both phosphates and nitrogen containing organic compounds and ammonia. Advantages of our process are most evident in waters containing moderate amounts of bicarbonate ion.

Hence, it is an object of our invention to upgrade the quality of water streams.

It is another object of this invention to remove substantially all nutrients from a waste water.

A specific object of this invention is to utilize biological nitrification to decrease buffering capacity of a waste water and thus reduce calcium requirements for phosphate insolubilization.

Another specific object of our invention is to recover a relatively concentrated precipitate comprising calcium hydroxyl apatite.

DETAILED DESCRIPTION OF THE INVENTION

Our invention will be more clearly understood by reference to the accompanying drawings in which:

FIG. 1 is a diagrammatic flow sheet of our process specially adapted for use in treating a domestic sewage stream.

FIG. 2 is a variant of FIG. 1 illustrating an embodiment of our invention having general application to waste water streams.

Turning now to FIG. 1, there is shown a diagrammatic flow sheet illustrating our process adapted for treating a raw waste water stream such as a typical domestic sewage. Domestic sewage streams almost without exception contain phosphates, ammonia, nitrogen-containing organic compounds and bicarbonate ion. Phosphate content usually ranges from about 5 to about 20 p.p.m.; most of which is in the ortho form. Total Kjeldahl nitrogen (TKN) generally falls within about the same range; most being in the form of ammonia. Bicarbonate ion concentration is of course dependent upon water hardness and ranges from less than 100 to 400 mg./l. or more (expressed as equivalent $CaCO_3$). Waste waters from Washington D.C. and lake Tahoe, for example, are of moderate alkalinity (100 to 150 mg./l.) while waste water from Lebanon, Ohio contains about 350 mg./l. bicarbonate.

Raw sewage stream 1 is passed to a primary clarifier 2 wherein much of the settleable solids load is removed as sludge stream 3. Clarified effluent is then passed via conduit 5 to biological oxidation step 4. This step is carried out in conventional fashion using either air or oxygen as the oxidizing gas. Effluent from the biological oxidation is then passed via line 7 to clarifier 6 which separates the effluent into a sludge fraction 8 and a clarified stream 11. A portion of the biologically active sludge stream 8 may be recycled to the oxidation step by means of line 9 while the remaining portion of the sludge may be merged with stream 3 for further treatment or disposal.

Effluent stream 11 is then subjected to biological nitrification in contacting means 10. The necessary oxygen to drive this step is supplied by diffusing means 12. There is maintained within nitrification stage 10 an enriched biological culture of nitrifiers maintained on a predominately ammonia feed. Since most of the carbonaceous material was removed in the biological oxidation step, cellular synthesis in the nitrification stage is low. Consequently, a high nitrifying population may be stably maintained within this stage.

The predominant reaction occuring in nitrification stage 10 is the conversion of ammonia to nitrate. This reaction is represented by the following general formula:

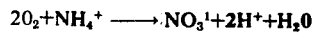
$$2O_2 + NH_4^+ \longrightarrow NO_3^- + 2H^+ + H_2O$$

As may be seen from the equation, each equivalent of ammonium ion produces two equivalents of hydrogen ion. Hydrogen ions in turn react with bicarbonate to form carbonic acid. This reaction is represented as follows:

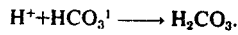
$$H^+ + HCO_3^- \longrightarrow H_2CO_3.$$

Carbonic acid in turn is in equilibrium with carbon dioxide and water represented as follows:

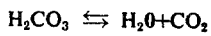
$$H_2CO_3 \leftrightarrows H_2O + CO_2$$

Aeration, as well as providing oxygen to drive the biological nitrification step, acts as a stripping agency thus continually removing carbon dioxide from the reaction mix. Hence, bicarbonate alkalinity of the water is reduced. Extent of bicarbonate reduction depends upon the ratio of nitrate produced by the nitrification step to the amount of bicarbonate contained in the water. Each 14 mg./l. of ammonia which is nitrified converts 100 mg./l. of bicarbonate alkalinity to carbonic acid. Most of the carbonic acid in turn is removed from the system by the stripping action occurring during aeration. A small portion of the carbon dioxide or bicarbonate ion may also be used by the autotrophic bacteria (nitrifiers) in cell synthesis.

Effluent from nitrification stage 10, now enriched in nitrate ion and depleted in bicarbonate ion, is passed to clarifier 13 by way of line 14. There, a sludge fraction 15 is removed or is returned to contacting means 10 as necessary to maintain an enriched biological culture of nitrifiers. A clarified effluent 17 is then passed to phosphate precipitation stage 16. Stage 16 may comprise any conventional contacting or mixing device capable of providing thorough and complete contacting of effluent stream 17 with the lime precipitating agent 18. Lime is highly preferred as the precipitant.

It is at this point that the advantages of our process become particularly evident. Lime has long been used in water and waste treatment for clarification purposes and to precipitate phosphates. Lime precipitation of phosphates when used in a conventional fashion requires large dosages because substantially complete phosphate removal or insolubilization is not achieved until a pH on the order of about 10 is reached.

When lime is added to a waste water, it first reacts with the buffer capacity of the water. Thereafter, the pH tends to rise rapidly and phosphate is insolubilized. The buffer capacity of most waste waters consists chiefly of bicarbonate ions with a relatively small contribution from acid phosphate ions ($HPO_4^{1}$ and $H_2PO_4^{1}$). Since buffer capacity of phosphate ions is usually quite small compared to that of bicarbonate ions, the lime dose required to remove phosphorus is nearly independent of phosphorus concentrations usually present but instead is dependent upon the amount of bicarbonate ion.

While the chemistry of lime precipitation is somewhat complex, it may be represented in a simplified fashion by the following equations:

$$Ca(OH)_2 + HCO_3^{1} \longrightarrow CaCO_3 + H_2O + OH^{1}$$

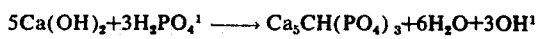

$$5Ca(OH)_2 + 3H_2PO_4^{1} \longrightarrow Ca_5CH(PO_4)_3 + 6H_2O + 3OH^{1}$$

As may be seen, the lime neutralizes the hydrogen acid equivalent of the buffer capacity, increases the pH by release of hydroxyl ion and finally precipitates calcium phosphates and carbonates. Sufficient lime must be added to perform all three functions since essentially complete insolubilization of phosphorus does not occur until about PH 10.

Each equivalent of bicarbonate hardness removed during the nitrification step represents a saving of one equivalent of lime during the phosphate precipitation step. Three substantial advantages arise out of this circumstance. First, lime dosage is reduced representing an economic saving in chemical cost. Second, substantially smaller quantities of sludge is produced resulting in a savings in solids treatment, handling and disposal. Third, a relatively rich calcium phosphate concentrate is produced. In fortuitous circumstances in which nitrogen content of the waste water closely balances bicarbonate hardness of the water, a substantially pure calcium hydroxylapatite is formed.

From the precipitation zone, the mixture of water and suspended calcium phosphate precipitate is passed via line 19 to separation means 20. Means 20 may comprise any filtration, clarification or separation means adapted to handle large water flows containing small amounts of suspended solids. A sand-type filter is preferred. Dual media filters employing sand and anthracite have functioned well in this application. The calcium phosphate precipitate is recovered by backwashing the filter media as is conventional. In cases where appreciable bicarbonate alkalinity remains after nitrification, the lime precipitation step is still accomplished at a reduced lime dose compared to the nonnitrified water. In these cases, a typical lime clarification and solids handling system would be employed to separate the calcium phosphate-calcium carbonate solids from the water. Amount of these solids would be reduced as compared to the nonnitrified water in proportion to the decrease in alkalinity.

Effluent from separation means 20 is then passed by way of conduit means 22 to denitrification zone 23. Denitrification is carried out biologically in an anaerobic environment. The process requires an organic carbon source in the presence of active denitrifying organisms. Since denitrifying organisms are ubiquitous and denitrification often occurs spontaneously, there are no difficulties in establishing such a culture. However, since substantially all organic carbon was previously removed from the stream, a nutrient source is required for this step. Methanol is the preferred carbon nutrient, but other lower alcohols, acetone, glucose and other organic carbon sources may be used as well.

Denitrification may be carried out in a closed tank reactor under conditions of slow mixing and extensive sludge recycle. It may also be carried out in a column type reactor utilizing either an inert medium such as sand or an active medium such as carbon. In the latter case, a carbon column may perform a dual function; supporting the denitrification reaction and adsorbing residual refractory organics not previously removed from the system. In any case, the reaction occurring is essentially the same. Nitrate ion is biologically decomposed to nitrogen gas. Provision is made for removal of nitrogen from the system as by means 24. Methanol addition is adjusted to nitrate content. Stoichiometric considerations require addition of twice as much methanol as nitrate on a weight basis but in practice it has been found necessary to add somewhat more than that theoretically required. However, methanol utilization is so complete that it is undetectable in the denitrification effluent.

Effluent 25 passes from the system for disposal or reuse. It may if desired be subjected to further conventional treatment. For example, effluent 25 may be passed through carbon columns to adsorb any residual impurities, it may be chlorinated, or the pH may be adjusted as by carbonation.

Turning now to FIG. 2, there is shown another variation of our process which is adapted for the treatment of a variety of waste waters including domestic sewage, industrial wastes and natural waters. Again, wastes which contain phosphate, nitrogen and bicarbonate are appropriate candidates for treatment by this method.

A raw waste water stream 30 is subjected to clarification in settler 31. Depending upon the characteristics of the waste water, this step may in some instances be unnecessary. A sludge fraction 32 and a clarified effluent stream 33 are recovered from the settler and the effluent is passed to nitrification stage 34. This step may perform a dual function. If the waste water contains substantial quantities of organic materials, as does domestic sewage, then biological carbonaceous oxidation may be accomplished simultaneously with nitrification. In this circumstance, the level of sludge wasting is decreased relative to a conventional biological oxidation and detention times generally are increased.

As was previously described, ammonia and organic nitrogen compounds are oxidized to the nitrate form in this stage while quantities of bicarbonate ion are removed from the system. Since a biological upset which interrupts nitrification would increase the amount of solids to be handled downstream in the lime precipitation system, it is desirable to provide means 36 for the emergency addition of chemical precipitants. Addition of either aluminum or iron salts to the nitrification stage during upset conditions insures phosphorus removal at this point and allows the system to continue functioning through a higher cost.

From the nitrification stage, nitrified effluent is passed to clarifier 37 by way of conduit 38. There suspended solids are removed as sludge stream 39, a portion of which is recycled to the nitrification zone via means 41 while the remainder is merged with sludge stream 32 for further treatment or disposal. Clarified effluent is then passed, via conduit 40 to phosphate precipitation zone 42 where lime is added by way of means 43 to raise the pH to the level at which phosphate is essentially completely insolubilized. From this zone, the mixture is passed by way of conduit 44 to filtration means 45 which functions as previously described. A calcium phosphate concentrate is recovered and removed from the system by way of means 46.

Filtered effluent, now essentially free of phosphate, is passed to denitrification zone 48 by way of conduit 47. Nutrient, preferably methanol, is added via metering means 49 and nitrogen resulting from the biological denitrification is removed from the system via 50. In a preferred mode of operation, the denitrified stream is passed via conduit 51 to carbon adsorption columns 52. Residual refractory organics are removed at this point and a product stream 52 is passed from the system.

The following examples will more thoroughly illustrate the advantages and unique features of our invention.

Example 1

Water samples of differing bicarbonate alkalinity were investigated to determine the amount of lime required to overcome the buffering capacity of the water. All samples were originally at pH of about 7.

TABLE 1

| Original Bicarbonate Alkalinity (mg./l.) | Lime Required (mg./l.) to Reach pH of: | |
|---|---|---|
| | 9 | 10 |
| 22 | 20 | 35 |
| 120 | 45 | 115 |
| 240 | 65 | 185 |
| 600 | 170 | 355 |

As may be seen, lime requirements increased in a fairly direct ratio with bicarbonate alkalinity. Most of the buffering capacity of bicarbonate has been exhausted by a pH level of 10.

Example 2

District of columbia domestic sewage was treated by the method corresponding to the flowsheet of FIG. 1. Bicarbonate alkalinity was 120 mg./l. as $CaCO_3$. Phosphorus content in the raw sewage was 8 mg./l. while nitrogen content (TKN) was 25 mg./l., mostly in the form of ammonia. The nitrified effluent was analyzed for phosphorus content as was the liquor within the phosphate precipitation zone at a pH of 9.5 and again upon practical completion of the precipitation at pH 10.0. Results were as follows:

TABLE 2

| Phosphorus Content in Water (mg./l.) | pH | | |
|---|---|---|---|
| | 7 | 9.5 | 10 |
| Total P (unfiltered) | 5.7 | 1.0 | 0.7 |
| Total P (filtered) | 5.5 | 0.6 | <0.3 |
| Ortho P (unfiltered) | 5.3 | 0.8 | 0.6 |
| Ortho P (filtered) | 4.9 | 0.4 | <0.2 |

Those samples analyzed in an unfiltered state had been allowed to settle and analysis was performed on the supernatant liquid. Those samples analyzed in a filtered state had been passed through a glass fiber filter. Analysis was performed on the filtrate. Lime requirements were about 35 mg./l. to raise the pH to 10. The precipitate obtained was a mixture of calcium carbonate and a calcium phosphate which had the approximate formula $Ca_5(OH)(PO_4)_3$ as determined by analysis. The calcium hydroxylapatite comprised about 80 percent of the precipitate, a concentration sufficiently high for direct use as an animal food supplement or a slow release fertilizer.

What is claimed is:

1. A process for removing nutrients from water streams containing bicarbonate ion, phosphates and nitrogen compounds which comprises:
   a. converting nitrogen compounds to the nitrate form by biological nitrification, said biological nitrification comprising aerating the water stream in the presence of a biological culture of nitrifying bacteria whereby oxygen is provided to drive the biological nitrification and whereby carbon dioxide, formed by reaction of bicarbonate ion with hydrogen ion produced in the nitrification, is stripped from the water stream;
   b. adding sufficient lime to the nitrified effluent from step (a) to insolubilize in the form of calcium phosphate compounds substantially all of the phosphates contained in the water stream, and
   c. separating the insolubilized calcium phosphate product from the water stream and converting nitrates contained in the stream to nitrogen gas by biological denitrification.

2. The process of claim 1 wherein the water stream is subjected to biological denitrification after separation of the insolubilized calcium phosphate product.

3. The process of claim 2 wherein sufficient lime is added to raise the pH of the nitrified effluent to above about 9.5

4. The process of claim 2 wherein the water stream is a domestic sewage stream.

5. The process of claim 4 wherein the sewage stream is subjected to carbonaceous oxidation prior to nitrification.

6. The process of claim 5 wherein the sewage stream contains more than about 5 mg./l. of nitrogen and of phosphorus compounds and less than about 150 mg./l. bicarbonate hardness.

7. The process of claim 6 wherein sufficient lime is added to raise the pH of the nitrified effluent to above about 10 and wherein the calcium phosphate product comprises calcium hydroxylapatite.

8. The process of claim 5 wherein the denitrified effluent is further treated by carbon adsorption.

9. The process of claim 5 wherein the nitrogen compounds comprise ammonia.

* * * * *